US009985675B2

(12) United States Patent
Park

(10) Patent No.: US 9,985,675 B2
(45) Date of Patent: May 29, 2018

(54) TRAY DEVICE AND ELECTRONIC DEVICE HAVING THE SAME

(71) Applicant: Samsung Electronics Co., Ltd, Gyeonggi-do (KR)

(72) Inventor: Joon-Yung Park, Gyeonggi-do (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days. days.

(21) Appl. No.: 15/409,453

(22) Filed: Jan. 18, 2017

(65) Prior Publication Data
US 2017/0207808 A1     Jul. 20, 2017

(30) Foreign Application Priority Data
Jan. 18, 2016 (KR) .................. 10-2016-0005900

(51) Int. Cl.
  *H04B 1/3818* (2015.01)
  *H04M 1/02* (2006.01)

(52) U.S. Cl.
  CPC ........ *H04B 1/3818* (2015.01); *H04M 1/0274* (2013.01)

(58) Field of Classification Search
  CPC ...... H04B 1/3818; H04B 1/38; H04B 1/3816; H04M 1/0274; H04M 1/0235; H04M 1/026; H04M 1/0283; H04M 2250/14; H04M 1/21; H04M 1/0249; H05K 5/0295; G06K 13/08; G06K 13/0831; G06F 1/00

See application file for complete search history.

(56) References Cited

U.S. PATENT DOCUMENTS

| 7,766,678 B1 * | 8/2010 | Abe ..................... H05K 5/0295 439/159 |
| 2014/0315404 A1 * | 10/2014 | Wang .................... G06K 13/08 439/159 |

FOREIGN PATENT DOCUMENTS

KR        101531176 B1     7/2015

* cited by examiner

*Primary Examiner* — James Yang

(57) ABSTRACT

An electronic device including a housing that encloses a space between opposing faces and has an opening in a side face of the housing, the opening including a hole portion. A tray is configured to be inserted into the hole during mounting of the tray and removed therefrom when the tray is demounted. The device further includes a first fixing structure disposed substantially parallel to a side face of the tray inside the hole, and configured to be at least partially rotated about an axis in a direction outwardly from the hole. Further, including two terminals vertically arranged inside the hole with the tray being interposed therebetween so the terminals do not contact the tray, and a control circuit electrically connected to at least one of the first terminal and the second terminal, wherein, when the first terminal and the second terminal are electrically connected to each other, the control circuit is configured to detect demounting of the tray, and when the first terminal and the second terminal are electrically separated from each other, the control circuit is configured to detect mounting of the tray from the hole portion.

20 Claims, 11 Drawing Sheets

TRAY DEVICE AND ELECTRONIC DEVICE HAVING THE SAME

CROSS-REFERENCE TO RELATED APPLICATION(S) AND CLAIM OF PRIORITY

The present application is related to and claims the priority under 35 U.S.C. § 119(a) to Korean Application Serial No. 10-2016-0005900, which was filed in the Korean Intellectual Property Office on Jan. 18, 2016, the entire content of which is hereby incorporated by reference.

TECHNICAL FIELD

Various embodiments of the present disclosure relate to an electronic device. In particular, various embodiments of the present disclosure relate to a tray device and an electronic device including the same.

BACKGROUND

While the above-described electronic devices have been diversified from a functional perspective, an advantage in portability will make the electronic devices more competitive. For example, even if electronic devices have the same function, an electronic device that is somewhat slimmer and smaller in weight and size, may be preferred. Accordingly, in practice, electronic device manufacturers put in effort to develop electronic devices that are slimmer and smaller in weight and size as compared with the other products while being equal or somewhat superior to the other products in functions.

As a part of the trend, the electronic devices include, in the inside thereof, removable external components, which have been selectively or essentially applied thereto, and such external components are being gradually miniaturized.

For example, such external components include card-type external components, such as a memory card, which may increase the storage space of an electronic device, and a Subscriber Identification Module so-called "SIM card," which is removably mounted so as to allow two or more users, who have obtained different certifications, to use one electronic device. Efforts have been made in order to apply the external components to the electronic devices more efficiently.

SUMMARY

External components, which are removably applied to an electronic device, may be mounted on an external component socket, which is disposed inside the electronic device, to be electrically connected to the electronic device, or may have a configuration that is electrically connected with an electronic device merely by applying the external components to a tray and mounting the tray to a socket.

According to various embodiments, where an external component is applied to an electronic device in a tray manner, a tray device may include a fixing structure configured to fix a tray that is substantially mounted to an electronic device, a demounting structure configured to demount the mounted tray from the electronic device, and a detection structure configured to detect the mounting/demounting of the tray. According to one embodiment, a conventional tray device has the above-mentioned detection structure, and is configured to detect an insertion of a tray as follows: when an elastic detection terminal (e.g., a detection pin), which is configured to be pushed in one way of an end of a tray, comes in physical contact with a switch terminal at the time of mounting the tray, power that has been pulled up to the switch terminal, is grounded through the detection terminal, and as a result, the switch terminal, which has generated a High signal, is switched into the state of generating a Low signal so that the insertion of the tray can be detected. However, with such a tray contact-type detection structure, an insulating coating material or an anodizing coating, which is formed on the outer surface of the tray, may be damaged due to the contact with a detection terminal as a result of the frequent mounting and demounting of the tray. Due to this, the power, which is necessary to be grounded through the switch terminal, leaks through the tray made of a metallic material, which may cause a danger of electric shock and the unnecessary consumption of power of the electronic device.

According to various embodiments, it is possible to provide a tray device and an electronic device including the same.

According to various embodiments, it is possible to provide a tray device including an improved detection structure for detecting the mounting/demounting of a tray.

According to various embodiments, there may be provided an electronic device including: a housing including a first face, a second face that faces opposite to the first face, and a side face that encloses at least a portion of a space between the first face and the second face; an opening formed in a portion of the side face of the housing; a hole continued to the opening; a tray including a first side face, a second side face at a side opposite to the first side face, a third face that extends between the first side face and the second side face, and a fourth side face that extends between the first side face and the second side face at a side opposite to the third side face, the tray having a length to be entirely inserted into the hole and configured to be demountable from the hole; a first fixing structure disposed to be substantially parallel to the first side face and/or the second side face of the tray inside the hole, and configured to be at least partially rotated about an axis in a first direction that is outwardly directed from the hole; first and second terminals vertically arranged inside the hole with the tray being interposed therebetween such that the first and second terminals do not come in contact with the tray; and a control circuit electrically connected to at least one of the first terminal and the second terminal, wherein, when the first terminal and the second terminal are electrically connected to each other, the control circuit is configured to detect demounting of the tray, and when the first terminal and the second terminal are electrically separated from each other, the control circuit is configured to detect mounting of the tray from the hole portion.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
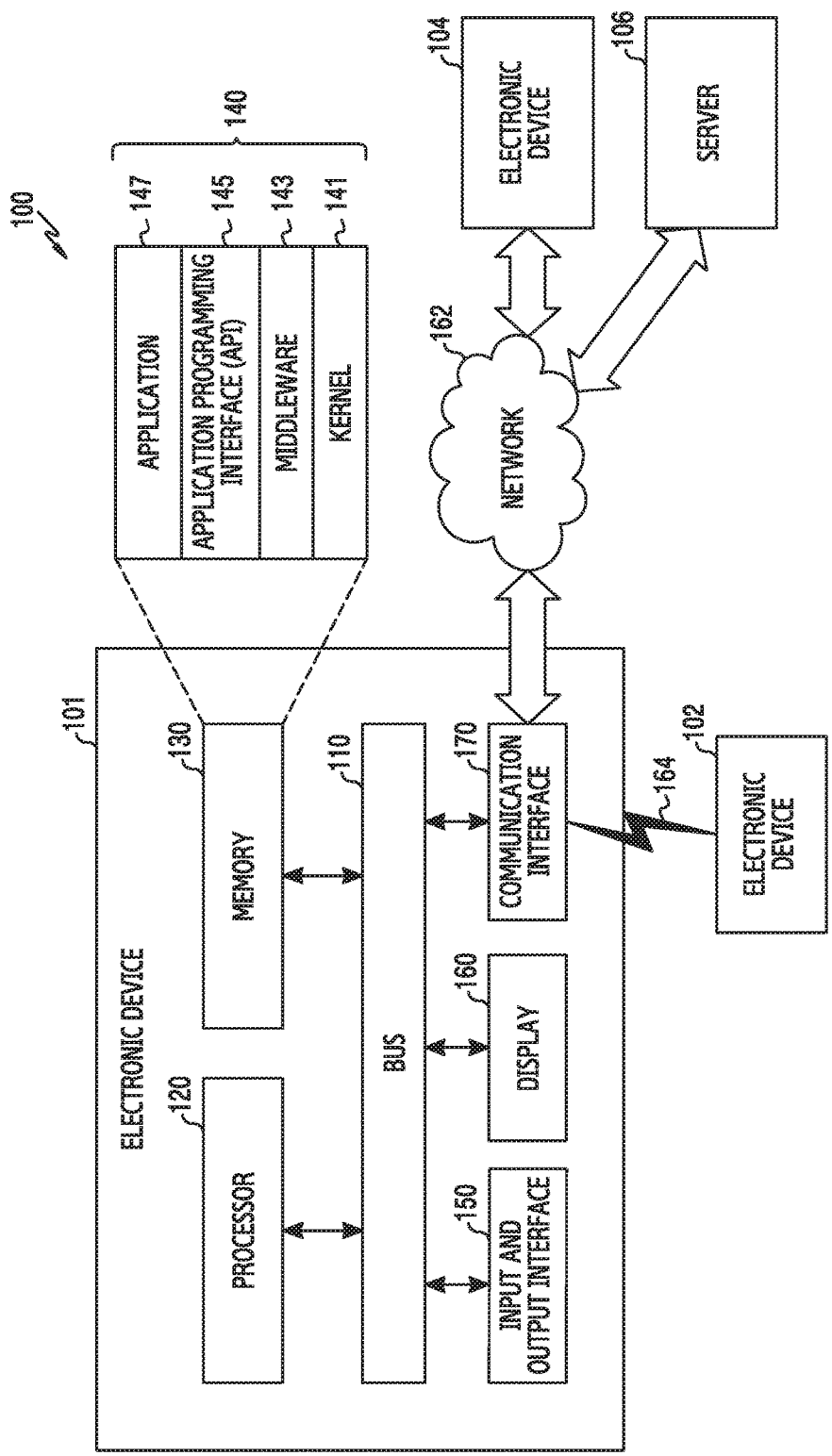
FIG. 1 is a view illustrating a network environment that includes an electronic device according to various embodiments of the present disclosure.

FIGS. 1 through 6B, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged electronic device.

The following description with reference to the accompanying drawings is provided to assist in a comprehensive understanding of various embodiments of the present disclosure as defined by the claims and their equivalents. It includes various specific details to assist in that understanding, but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to their dictionary meanings, but are merely used to enable a clear and consistent understanding of the present disclosure. Accordingly, it should be apparent to those skilled in the art that the following description of various embodiments of the present disclosure is provided for illustrative purposes only and not for the purpose of limiting the present disclosure as defined by the appended claims and their equivalents.

It is to be understood that the singular forms "a," "an," and "the" include plural references unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

The terms "include" and "may include" used herein are intended to indicate the presence of a corresponding function, operation, or constitutional element disclosed herein, and are not intended to limit the presence of one or more functions, operations, or constitutional elements. In addition, the terms "include" and "have" are intended to indicate that characteristics, numbers, operations, constitutional elements, and elements disclosed in the specification or combinations thereof exist. However, additional possibilities of one or more other characteristics, numbers, operations, constitutional elements, elements or combinations thereof may exist.

As used herein, the expression "or" includes any and all combinations of words enumerated together. For example, "A or B" may include either A or B, or may include both A and B.

Although expressions used in various embodiments of the present disclosure, such as "1st", "2nd", "first", "second" may be used to express various constituent elements of the various embodiments of the present disclosure, these expressions are not intended to limit the corresponding constituent elements. The above expressions are not intended to limit an order or an importance of the corresponding constituent elements. The above expressions may be used to distinguish one constituent element from another constituent element. For example, a first user device and the second user device are both user devices, and indicate different user devices. Similarly, a first constituent element may be referred to as a second constituent element, and the second constituent element may be referred to as the first constituent element without departing from the scope of the present disclosure.

When an element is mentioned as being "connected" to or "accessing" another element, this may mean that the element is directly connected to or accessing the other element, or there may be intervening elements present between the two elements. On the other hand, when an element is mentioned as being "directly connected" to or "directly accessing" another element, it is to be understood that there are no intervening elements present.

The term "module" as used herein may imply a unit including one of hardware, software, and firmware, or a combination thereof. The term "module" may be interchangeably used with terms, such as unit, logic, logical block, component, circuit, and the like. A module as described herein may be a minimum unit of an integrally constituted component or may be a part thereof. The module may be a minimum unit for performing one or more functions or may be a part thereof. The module may be mechanically or electrically implemented. For example, the module as described herein includes at least one of an application-specific integrated circuit (ASIC) chip, a field-programmable gate arrays (FPGAs), and a programmable-logic device, which are known or will be developed and which perform certain operations.

By the term "substantially" it is meant that the recited characteristic, parameter, or value need not be achieved exactly, but that deviations or variations, including, but not limited to, for example, tolerances, measurement errors, measurement accuracy limitations and other factors known to persons of ordinary skill in the art, may occur in amounts that do not preclude the effect the characteristic was intended to provide.

Unless otherwise defined, all terms, including technical and scientific terms, used herein have the same meaning as commonly understood by those of ordinary skill in the art to which various embodiments of the present disclosure belong. It will be further understood that terms, such as those defined in commonly used dictionaries, should be interpreted as having meanings that are consistent with their meaning in the context of the relevant art and the various embodiments of the present disclosure, and should not be interpreted in an idealized or overly formal sense unless expressly so defined herein.

An electronic device as used herein may be a device including, but not limited to, an antenna capable of performing a communication function in at least one frequency band. For example, the electronic device may be a smart phone, a tablet personal computer (PC), a mobile phone, a video phone, an e-book reader, a desktop PC, a laptop PC, a netbook computer, a personal digital assistant (PDA), a portable multimedia player (PMP), a moving picture experts group phase 1 or phase 2 (MPEG-1 or MPEG-2) audio layer 3 (MP3) player, a mobile medical device, a camera, and a wearable device (e.g., a head-mounted-device (HMD), such as electronic glasses, electronic clothes, an electronic bracelet, an electronic necklace, an electronic appcessory, an electronic tattoo, a smart watch, and the like).

The electronic device may be a smart home appliance having an antenna. For example, the smart home appliance may include at least one of a television (TV), a digital versatile disc (DVD) player, an audio player, a refrigerator, an air conditioner, a cleaner, an oven, a microwave oven, a washing machine, an air purifier, a set-top box, a TV box (e.g., Samsung HomeSync®, Apple TV®, or Google TV®), a game console, an electronic dictionary, an electronic key, a camcorder, and an electronic picture frame.

The electronic device including the antenna may be one of various medical devices (e.g., magnetic resonance angiography (MRA), magnetic resonance imaging (MM), computed tomography (CT), imaging equipment, an ultrasonic instrument, and the like), a navigation device, a global positioning system (GPS) receiver, an event data recorder (EDR), a flight data recorder (FDR), a car infotainment device, electronic equipment for a ship (e.g., a vessel navigation device, a gyro compass, and the like), avionics, a security device, a car head unit, an industrial or domestic robot, an automatic teller machine (ATM), a point of sales (POS) device, and the like.

The electronic device may be part of at least one of an item of furniture or a building/structure including an antenna. The electronic device may be an electronic board, an electronic signature input device, a projector, or any of various measurement machines (e.g., water supply, electricity, gas, a propagation measurement machine, and the like).

The electronic device may be one or more combinations of the aforementioned various devices. In addition, the electronic device may be a flexible device. Moreover, the electronic device is not limited to the aforementioned devices.

Hereinafter, an electronic device according to various embodiments of the present disclosure will be described with reference to the accompanying drawings. The term 'user' used in the various embodiments may refer to a person who uses the electronic device or a device which uses the electronic device (e.g., an artificial intelligence (AI) electronic device).

FIG. 1 illustrates a view of a network environment including an electronic device according to an embodiment of the present disclosure.

Referring to FIG. 1, a network environment 100 includes an electronic device 101. The electronic device 101 includes a bus 110, a processor 120, a memory 130, an input/output interface 150, a display 160, and a communication interface 170. In various embodiments of the present disclosure, the electronic device 101 can omit at least one of the components or further include another component.

The bus 110 includes a circuit for connecting the components (e.g., the processor 120, the memory 130, the input/output interface 150, the display 160, and the communication interface 170) and delivering communications (e.g., a control message) therebetween.

The processor 120 includes one or more of a central processing unit (CPU), an application processor (AP), and a communication processor (CP). The processor 120 processes an operation or data on control of and/or communication with another component of the electronic device 101.

The processor 120, which is connected to the long term evolution (LTE) network, determines whether a call is connected over the circuit switched (CS) service network using caller identification information (e.g., a caller phone number) of the CS service network (e.g., the 2nd generation (2G)/3rd generation (3G) network). For example, the processor 120 receives incoming call information (e.g., a CS notification message or a paging request message) of the CS service network over the long term evolution (LTE) network (e.g., circuit-switched fallback (CSFB)). The processor 120 being connected to the LTE network receives incoming call information (e.g., a paging request message) over the CS service network (e.g., single radio LTE (SRLTE)).

When receiving the incoming call information (e.g., a CS notification message or a paging request message) of the CS service network over the LTE network, the processor 120 obtains caller identification information from the incoming call information. The processor 120 displays the caller identification information on the display 160. The processor 120 determines whether to connect the call based on input information corresponding to the caller identification information displayed on the display 160. For example, when detecting input information corresponding to an incoming call rejection, through the input/output interface 150, the processor 120 restricts the voice call connection and maintains the LTE network connection. For example, when detecting input information corresponding to an incoming call acceptance, through the input/output interface 150, the processor 120 connects the voice call by connecting to the CS service network.

When receiving the incoming call information (e.g., a CS notification message or a paging request message) of the CS service network over the LTE network, the processor 120 obtains caller identification information from the incoming call information. The processor 120 determines whether to connect the call by comparing the caller identification information with a reception control list. For example, when the caller identification information is included in a first reception control list (e.g., a blacklist), the processor 120 restricts the voice call connection and maintains the connection to the LTE network. When the caller identification information is not included in the first reception control list (e.g., the blacklist), the processor 120 connects the voice call by connecting to the CS service network. When the caller identification information is included in a second reception control list (e.g., a white list), the processor 120 connects the voice call by connecting to the CS service network.

When receiving the incoming call information (e.g., a paging request message) of the CS service network over the LTE network, the processor 120 sends an incoming call response message (e.g., a paging response message) to the CS service network. The processor 120 suspends the LTE service and receives the caller identification information (e.g., a circuit-switched call (CC) setup message) from the CS service network. The processor 120 determines whether to connect the call by comparing the caller identification information with the reception control list. For example, when the caller identification information is included in the first reception control list (e.g., the blacklist), the processor 120 restricts the voice call connection and resumes the LTE network connection. When the caller identification information is not included in the first reception control list (e.g., the blacklist), the processor 120 connects the voice call by connecting to the CS service network. For example, when the caller identification information is included in the second reception control list (e.g., the white list), the processor 120 connects the voice call by connecting to the CS service network.

The memory 130 can include volatile and/or nonvolatile memory. The memory 130 stores commands or data (e.g., the reception control list) relating to at least another component of the electronic device 101. The memory 130 may store software and/or a program 140. The program 140 may include a kernel 141, middleware 143, an application programming interface (API) 145, and/or application programs (or "applications") 147. At least some of the kernel 141, the middleware 143, and the API 145 may be referred to as an operating system (OS).

The kernel 141 controls or manages system resources (e.g., the bus 110, the processor 120, or the memory 130) used for performing an operation or function implemented by the other programs (e.g., the middleware 143, the API 145, or the applications 147). Furthermore, the kernel 141 provides an interface through which the middleware 143, the API 145, or the applications 147 connects the individual elements of the electronic device 101 to control or manage the system resources.

The middleware 143 functions as an intermediary for allowing the API 145 or the applications 147 to communicate with the kernel 141 to exchange data.

In addition, the middleware 143 processes one or more task requests received from the applications 147 according to priorities thereof. For example, the middleware 143 assigns priorities for using the system resources (e.g., the bus 110, the processor 120, the memory 130, etc.) of the electronic device 101, to at least one of the applications 147. For example, the middleware 143 may perform scheduling or load balancing on the one or more task requests by processing the one or more task requests according to the priorities assigned thereto.

The API 145 is an interface through which the applications 147 control functions provided from the kernel 141 or the middleware 143, and may include at least one interface or function (e.g., an instruction) for file control, window control, image processing, text control, etc.

The input/output interface 150 functions as an interface that transfers instructions or data input from a user or another external device to the other element(s) of the electronic device 101. Furthermore, the input/output interface 150 outputs the instructions or data received from the other element(s) of the electronic device 101 to the user or an external electronic device.

The display 160 may include a liquid crystal display (LCD), a light emitting diode (LED) display, an organic LED (OLED) display, a micro electro mechanical system (MEMS) display, an electronic paper display, etc. The display 160 displays various types of content (e.g., text, images, videos, icons, symbols, etc.) for the user. The display 160 may include a touch screen and receive, for example, a touch, a gesture, proximity, a hovering input, etc., using an electronic pen or the user's body part. The display 160 may display a web page.

The communication interface 170 can establish a communication between the electronic device 101 and an external electronic device (e.g., a first external electronic device 102, a second external electronic device 104, or a server 106). For example, the communication interface 170 can communicate with the first external electronic device 102, the second external electronic device 104, or the server 106 in connection to the network 162 through wireless communication or wired communication or via a short-range communication 164. For example, the wireless communication can conform to a cellular communication protocol including at least one of LTE, LTE-advanced (LTE-A), code division multiple access (CDMA), wideband CDMA (WCDMA), universal mobile telecommunication system (UMTS), wireless broadband (WiBro), and global system for mobile communications (GSM).

The wired communication can include at least one of universal serial bus (USB), high definition multimedia interface (HDMI), recommended standard 232 (RS-232), and plain old telephone service (POTS).

The network 162 can include at least one of telecommunications networks, for example, a computer network (e.g., local area network (LAN) or wide area network (WAN)), internet, and a telephone network.

The electronic device 101 provides the LTE service in the single radio environment by use of at least one module functionally or physically separated from the processor 120.

Each of the first and second external electronic devices 102 and 104 may be a type of device that is the same as or different from the electronic device 101. According to an embodiment of the present disclosure, the server 106 may include a group of one or more servers. All or some of the operations to be executed by the electronic device 101 may be executed by another electronic device or a plurality of other electronic devices (e.g., the electronic devices 102 and 104 or the server 106). In the example where the electronic device 101 may perform a certain function or service automatically or by request, the electronic device 101 may request some functions that are associated therewith from the other electronic devices (e.g., the electronic devices 102 and 104 or the server 106) instead of or in addition to executing the function or service by itself. The other electronic devices (e.g., the electronic devices 102 and 104 or the server 106) may execute the requested functions or additional functions, and may transmit the results to the electronic device 101. The electronic device 101 may provide the requested functions or services by processing the received results. For this purpose, for example, a cloud computing technique, a distributed computing technique, or a client-server computing technique may be used.

Figure 2:
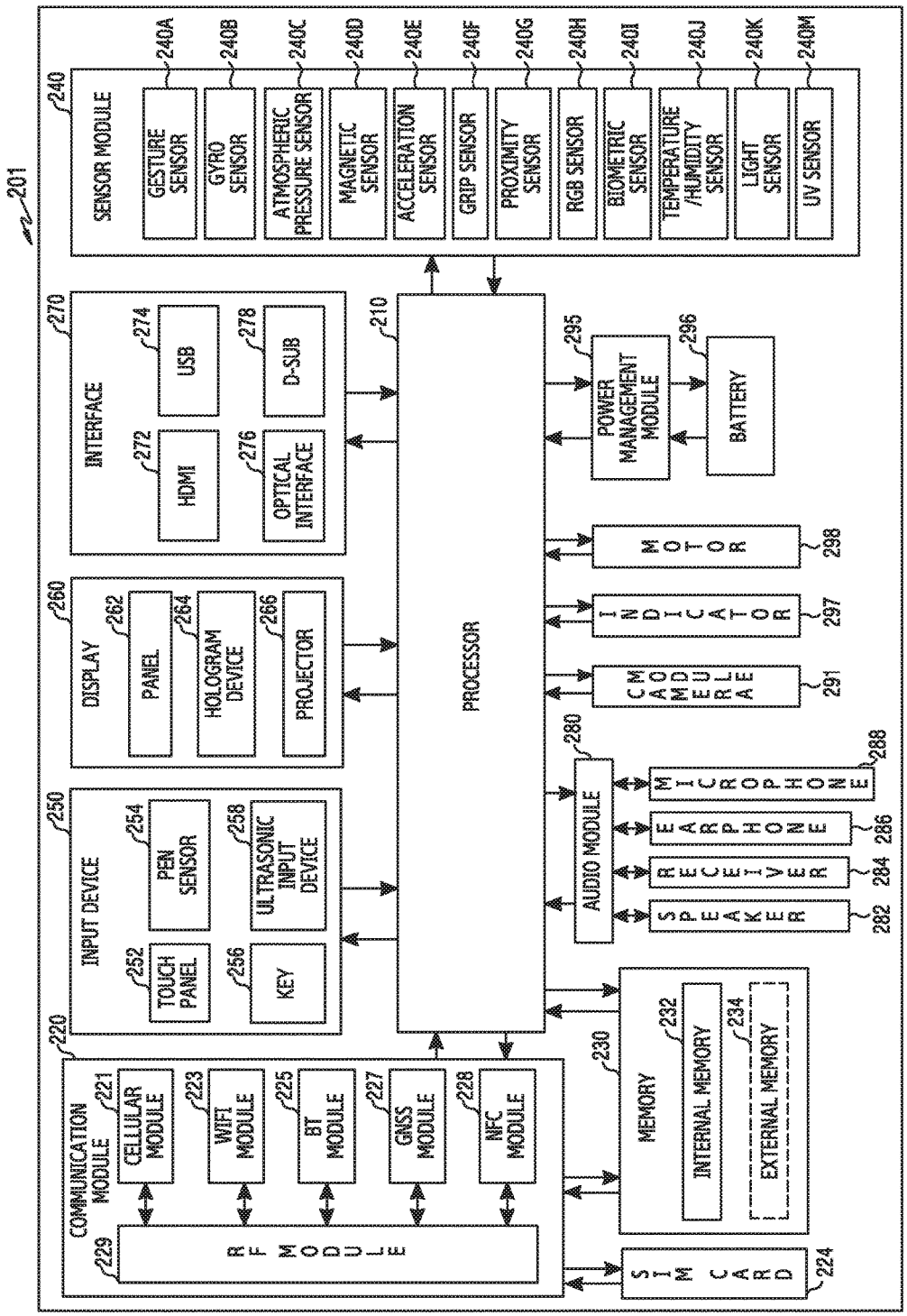
FIG. 2 is a block diagram of an electronic device according to various embodiments of the present disclosure.

FIG. 2 illustrates a diagram of a configuration of an electronic device according to an embodiment of the present disclosure.

Referring to FIG. 2, a configuration of the electronic device 201 is provided. The electronic device 201 may include all or some of the components described with reference to the electronic device 101 of FIG. 1. The electronic device 201 includes at least one AP 210, a communication module 220, a subscriber identification module (SIM) card 224, a memory 230, a sensor module 240, an input device 250, a display 260, an interface 270, an audio module 280, a camera module 291, a power management module 295, a battery 296, an indicator 297, and a motor 298.

The AP 210 controls a plurality of hardware or software elements connected to the AP 210 by driving an OS or an application program. The AP 210 processes a variety of data, including multimedia data, and performs arithmetic operations. The AP 210 may be implemented, for example, with a system on chip (SoC). The AP 210 may further include a graphical processing unit (GPU).

The communication module 220 performs data transmission/reception in communication between the external electronic device 104 or the server 106 which may be connected with the electronic device 201 through the network 162. The communication module 220 includes a cellular module 221, a Wi-Fi module 223, a BT module 225, a global navigation satellite system (GNSS) or GPS module 227, a near field communication (NFC) module 228, and a radio frequency (RF) module 229.

The cellular module 221 provides a voice call, a video call, a text service, an internet service, and the like, through a communication network (e.g., LTE, LTE-A, CDMA, WCDMA, UMTS, WiBro, and GSM, and the like). In addition, the cellular module 221 identifies and authenticates the electronic device 201 within the communication network by using the SIM card 224. The cellular module 221 may perform at least some of functions that can be provided by the AP 210. For example, the cellular module 221 may perform at least some of multimedia control functions.

The cellular module 221 includes a CP. Further, the cellular module 221 may be implemented, for example, with an SoC. Although elements, such as the cellular module 221 (e.g., the CP), the memory 230, and the power management module 295 are illustrated as separate elements with respect to the AP 210 in FIG. 2, the AP 210 may also be implemented such that at least one part (e.g., the cellular module 221) of the aforementioned elements is included in the AP 210.

The AP 210 or the cellular module 221 loads an instruction or data, which is received from each non-volatile memory connected thereto or at least one of different elements, to a volatile memory and processes the instruction or data. In addition, the AP 210 or the cellular module 221 stores data, which is received from at least one of different elements or generated by at least one of different elements, into the non-volatile memory.

Each of the Wi-Fi module 223, the BT module 225, the GNSS module 227, and the NFC module 228 includes a processor for processing data transmitted/received through a corresponding module. Although the cellular module 221, the Wi-Fi module 223, the BT module 225, the GNSS module 227, and the NFC module 228 are illustrated in FIG. 2 as separate blocks, at least some (e.g., two or more) of the cellular module 221, the Wi-Fi module 223, the BT module 225, the GNSS module 227, and the NFC module 228 may be included in one integrated chip (IC) or IC package. For example, at least some of processors corresponding to the cellular module 221, the Wi-Fi module 223, the BT module 225, the GNSS module 227, and the NFC module 228 (e.g., a communication processor corresponding to the cellular module 221 and a Wi-Fi processor corresponding to the Wi-Fi module 223) may be implemented with an SoC.

The RF module 229 transmits/receives data, such as an RF signal. The RF module 229 may include a transceiver, a power amp module (PAM), a frequency filter, a low noise amplifier (LNA), and the like. In addition, the RF module 229 may further include a component for transmitting/receiving a radio wave on a free space in wireless communication, for example, a conductor, a conducting wire, and the like. Although it is illustrated in FIG. 2 that the cellular module 221, the Wi-Fi module 223, the BT module 225, the GNSS module 227, and the NFC module 228 share one RF module 229, at least one of the cellular module 221, the Wi-Fi module 223, the BT module 225, the GNSS module 227, the NFC module 228 may transmit/receive an RF signal via a separate RF module.

The SIM card 224 may be inserted into a slot formed at a specific location of the electronic device 201. The SIM card 224 includes unique identification information (e.g., an integrated circuit card identifier (ICCID)) or subscriber information (e.g., an international mobile subscriber identity (IMSI)).

The memory 230 includes an internal memory 232 or an external memory 234.

The internal memory 232 may include at least one of a volatile memory (e.g., a dynamic random access memory (DRAM), a static RAM (SRAM), a synchronous dynamic RAM (SDRAM), and the like) or a non-volatile memory (e.g., a one-time programmable read only memory (OTPROM), a programmable ROM (PROM), an erasable and programmable ROM (EPROM), an electrically erasable and programmable ROM (EEPROM), a mask ROM, a flash ROM, a not and (NAND) flash memory, a not or (NOR) flash memory, and the like). The internal memory 232 may be a solid state drive (SSD).

The external memory 234 may include a flash drive, and may further include, for example, compact flash (CF), secure digital (SD), micro-SD, mini-SD, extreme digital (xD), memory stick, and the like. The external memory 234 may be operatively coupled to the electronic device 201 via various interfaces.

The electronic device 201 may further include a storage unit (or a storage medium), such as a hard drive.

The sensor module 240 measures a physical quantity or detects an operation state of the electronic device 201, and converts the measured or detected information into an electric signal. The sensor module 240 includes, for example, at least one of a gesture sensor 240A, a gyro sensor 240B, a barometric pressure sensor or air sensor 240C, a magnetic sensor 240D, an acceleration sensor 240E, a grip sensor 240F, a proximity sensor 240G, a color sensor 240H (e.g., a red, green, blue (RGB) sensor), a biometric sensor 240I, a temperature/humidity sensor 240J, an illumination/illuminance sensor 240K and an ultraviolet (UV) sensor 240M.

Additionally or alternatively, the sensor module 240 may include, for example, an E-node sensor, an electromyography (EMG) sensor, an electroencephalogram (EEG) sensor, an electrocardiogram (ECG) sensor, a fingerprint sensor, and the like.

The sensor module 240 may further include a control circuit for controlling at least one or more sensors included therein.

The input device 250 includes a touch panel 252, a (digital) pen sensor 254, a key 256, or an ultrasonic input unit 258.

The touch panel 252 recognizes a touch input by using at least one of an electrostatic type configuration, a pressure-sensitive type configuration, and an ultrasonic type configuration. The touch panel 252 may further include a control circuit. In the instance where the touch panel is of the electrostatic type, not only is physical contact recognition possible, but proximity recognition is also possible. The touch penal 252 may further include a tactile layer, which provides the user with a tactile reaction.

The (digital) pen sensor 254 may include a recognition sheet which is a part of the touch panel or is separated from the touch panel. The key 256 may include a physical button, an optical key, or a keypad. The ultrasonic input device 258 may detect ultrasonic waves generated by an input tool through the microphone 288, and may confirm data corresponding to the detected ultrasonic waves.

The (digital) pen sensor 254 may be implemented by using the same or similar method of receiving a touch input of the user or by using an additional sheet for recognition.

The key 256 may be a physical button, an optical key, a keypad, or a touch key.

The ultrasonic input unit 258 is a device by which the electronic device 201 detects a reflected sound wave through a microphone 288 and is capable of radio recognition. For example, an ultrasonic signal, which may be generated by using a pen, may be reflected off an object and detected by the microphone 288.

The electronic device 201 may use the communication module 220 to receive a user input from an external device (e.g., a computer or a server) connected thereto.

The display 260 includes a panel 262, a hologram 264, or a projector 266.

The panel 262 may be an LCD, an active-matrix organic light-emitting diode (AM-OLED), and the like. The panel 262 may be implemented in a flexible, transparent, or wearable manner. The panel 262 may be constructed as one module with the touch panel 252.

The hologram device 264 uses an interference of light and displays a stereoscopic image in the air.

The projector 266 displays an image by projecting a light beam onto a screen. The screen may be located inside or outside the electronic device 201.

The display 260 may further include a control circuit for controlling the panel 262, the hologram device 264, or the projector 266.

The interface 270 may include an HDMI 272, a USB 274, an optical communication interface 276, or a D-subminiature (D-sub) 278. The interface 270 may be included, for example, in the communication interface 160 of FIG. 1. Additionally or alternatively, the interface 270 may include, for example, mobile high-definition link (MHL), SD/multimedia card (MMC) or infrared data association (IrDA).

The audio module 280 bilaterally converts a sound and an electric signal. At least some elements of the audio module 280 may be included in the input/output interface 150 of FIG. 1. The audio module 280 converts sound information which is input or output through a speaker 282, a receiver 284, an earphone 286, the microphone 288, and the like.

The speaker 282 may output a signal of an audible frequency band and a signal of an ultrasonic frequency band. Reflected waves of an ultrasonic signal emitted from the speaker 282 may be received, or a signal of an external audible frequency band may also be received.

The camera module 291 is a device for image and video capturing, and may include one or more image sensors (e.g., a front sensor or a rear sensor), a lens, an image signal processor (ISP), or a flash (e.g., an LED or a xenon lamp). In certain instances, it may prove advantageous to include two or more camera modules.

The power management module 295 manages power of the electronic device 201. The power management module 295 may include a power management integrated circuit (PMIC), a charger IC, or a battery gauge.

The PMIC may be placed inside an IC or SoC semiconductor. Charging is classified into wired charging and wireless charging. The charger IC charges a battery, and prevents an over-voltage or over-current flow from a charger. The charger IC includes a charger IC for at least one of the wired charging and the wireless charging.

The wireless charging may be classified, for example, into a magnetic resonance type, a magnetic induction type, and an electromagnetic type. An additional circuit for the wireless charging, for example, a coil loop, a resonant circuit, a rectifier, and the like, may be added.

The battery gauge may measure a residual quantity of the battery 296 and a voltage, current, and temperature during charging. The battery 296 stores or generates electricity and supplies power to the electronic device 201 by using the stored or generated electricity. The battery 296 may include a rechargeable battery or a solar battery.

The indicator 297 indicates a specific state, such as a booting state, a message state, a charging state, and the like, of the electronic device 201 or a part thereof (e.g., the AP 210).

The motor 298 converts an electric signal into a mechanical vibration.

The electronic device 201 includes a processing unit (e.g., a GPU) for supporting mobile TV. The processing unit for supporting mobile TV processes media data according to a protocol of, for example, digital multimedia broadcasting (DMB), digital video broadcasting (DVB), media flow, and the like.

Each of the aforementioned elements of the electronic device 201 may consist of one or more components, and names thereof may vary depending on a type of the electronic device 201. The electronic device 201 may include at least one of the aforementioned elements. Some of the elements may be omitted, or additional other elements may be further included. In addition, some of the elements of the electronic device 201 may be combined and constructed as one entity, so as to equally perform functions of corresponding elements before combination.

At least some parts of a device (e.g., modules or functions thereof) or method (e.g., operations) may be implemented with an instruction stored in a computer-readable storage media for example. The instruction may be executed by the processor 210, to perform a function corresponding to the instruction. The computer-readable storage media may be the memory 230. At least some parts of the programming module may be implemented (e.g., executed) by the processor 210. At least some parts of the programming module may include modules, programs, routines, a set of instructions, processes, and the like, for performing one or more functions.

Figure 3:
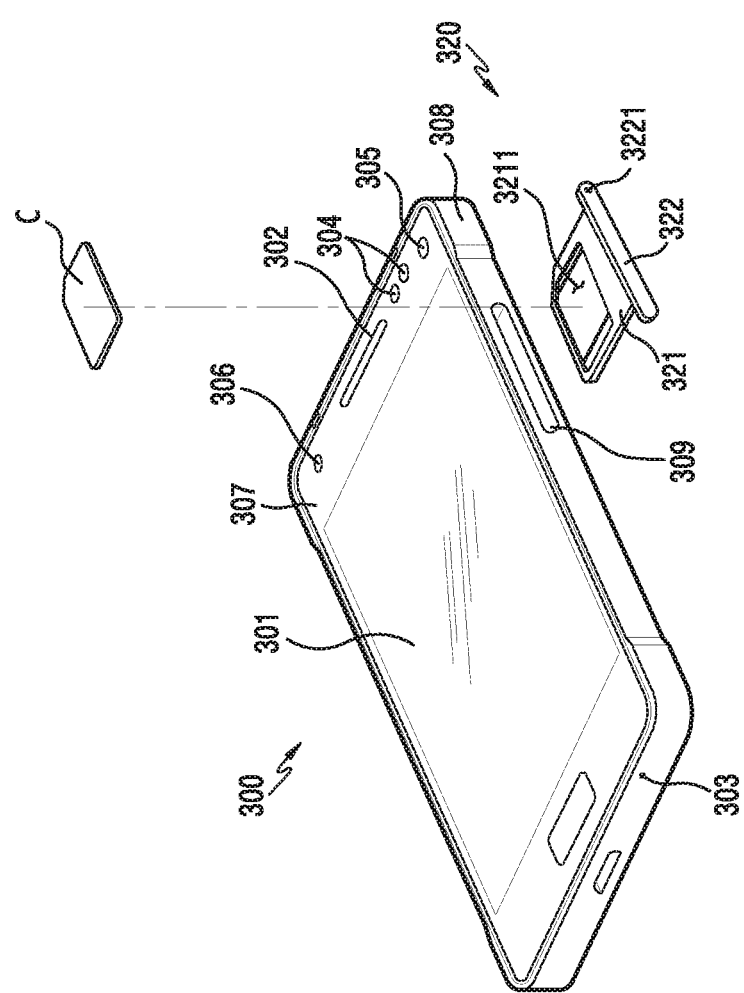
FIG. 3 is a perspective view illustrating a state in which a tray is applied to an electronic device according to various embodiments of the present disclosure.

FIG. 3 is a perspective view illustrating a state in which a tray is applied to an electronic device according to various embodiments of the present disclosure.

Referring to FIG. 3, a display 301 may be provided on a face 307 of the electronic device 300. A speaker device 302 may be installed above the display 301 so as to receive a voice of a counterpart. A microphone device 303 may be installed below the display 301 so as to transmit a voice of the user of the electronic device to the counterpart.

According to various embodiments, the display 301 may include a touch display that includes a touch sensor (a contact type touch sensor or a non-contact type touch sensor (digitizer)). According to one embodiment, the display 301 may include a pressure sensor so as to detect an external force applied to the face of the display 301. According to one embodiment, the electronic device 300 may conduct a corresponding function based on an external force detected on the display 301.

According to various embodiments, components for conducting various functions of the electronic device 300 may be arranged around the speaker device 302. The components may include one or more sensor modules 304. The sensor modules 304 may include at least one of, for example, an illuminance sensor (e.g., an optical sensor), a proximity sensor, an infrared sensor, and an ultrasonic sensor. According to one embodiment, the components may include a camera device 305. According to one embodiment, the components may include an LED indicator 306 configured to inform the user of the status information of the electronic device 300.

According to various embodiments, the electronic device may include a side face 308 that extends from the face 307 and may form at least a portion of the thickness of the electronic device 300. According to one embodiment, an opening 309 having a predetermined length may be formed in the side face 308. According to one embodiment, the opening 309, which is to accommodate a tray to be described later, may include a hole extending to the inside of the electronic device 300 to have a predetermined length for accommodating a tray 320. According to one embodiment, the hole may be formed in a length that at least corresponds to the length of the tray.

According to various embodiments, the tray 320 may include a tray body 321 inserted into the above-mentioned opening 309, and a tray cover 322 disposed on an end of the tray body 321. According to one embodiment, the tray body 321 may include at least one external component accommodation portion 3211 for accommodating at least one external component. According to one embodiment, the tray cover 322 may include a pin insertion hole 3221 that is formed to allow at least a portion of a tray demounting pin to be penetrated into the electronic device therethrough. According to one embodiment, the tray body 321 and the tray cover 322 may be integrally formed or may be configured with a combination of different members. According to one embodiment, the tray 320 may be formed of a metallic material. Without being limited thereto, however, the tray 320 may be formed of a synthetic resin material, a composite material, or the like. According to one embodiment, when the tray body and the tray cover are individually formed and assembled to each other, different members may be applied.

According to various embodiments, the tray cover 322 is a portion that is exposed to the outside of the electronic device 300 when the tray 320 is mounted to the electronic device 300, and may be disposed to be or not to be flush with the outer surface of the electronic device 300.

According to various embodiments, an external component C may be mounted on the external component accommodation portion 3211 of the tray body 321. According to one embodiment, the external component C may be a card-type external device. According to one embodiment, the card-type external device may be a memory card. According to one embodiment, the card-type external device may be a Subscriber Identification Module (SIM) or User Identification Module (UIM) card.

According to various embodiments, when the external component C is mounted on the tray body 321 and then the tray body 321 is substantially mounted in the opening 309 of the electronic device 300, the external component C may be electrically connected with the electronic device 300 within the electronic device 300. According to one embodiment, the external component C may be electrically connected in such a manner in which at least one terminal exposed on the tray body 321 comes in contact with at least one connector mounted on a board of the electronic device 300. According to one embodiment, when the tray body 321 is inserted into a tray socket disposed inside the electronic device 300, the at least one exposed terminal may be electrically connected in such a manner of coming in contact with at least one connector included inside the socket mounted on the board of the electronic device 300.

According to various embodiments, the tray 320 may include a detection device (e.g., 460 in FIG. 4A) configured to detect the insertion of the tray 320 when the tray 320 is substantially inserted into the opening 309 of the electronic device 300, or to detect the mounting/demounting of the tray 320. According to one embodiment, the detection device may prevent current leakage so as to prevent an electric shock accident or unnecessary power consumption by being implemented so as to prevent power from being applied to a detection terminal even if a portion of a metallic exterior is exposed when the mounting/demounting operation of the tray made of a metallic material is frequently performed.

Hereinafter, the tray device will be described in more detail.

Figure 4A:
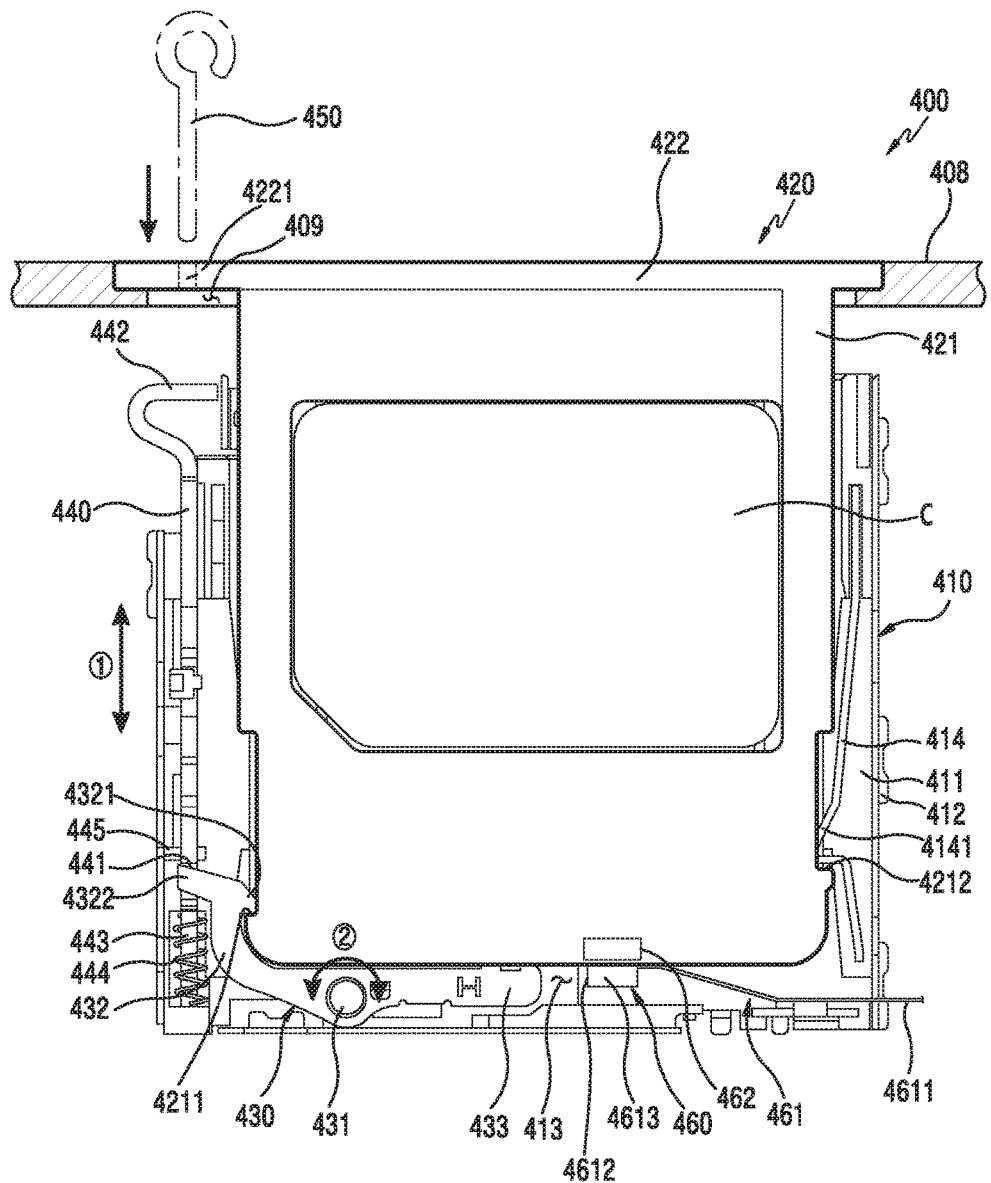
FIG. 4A is a view illustrating a state in which a tray according to various embodiments of the present disclosure is mounted to an electronic device.
Figure 4B:
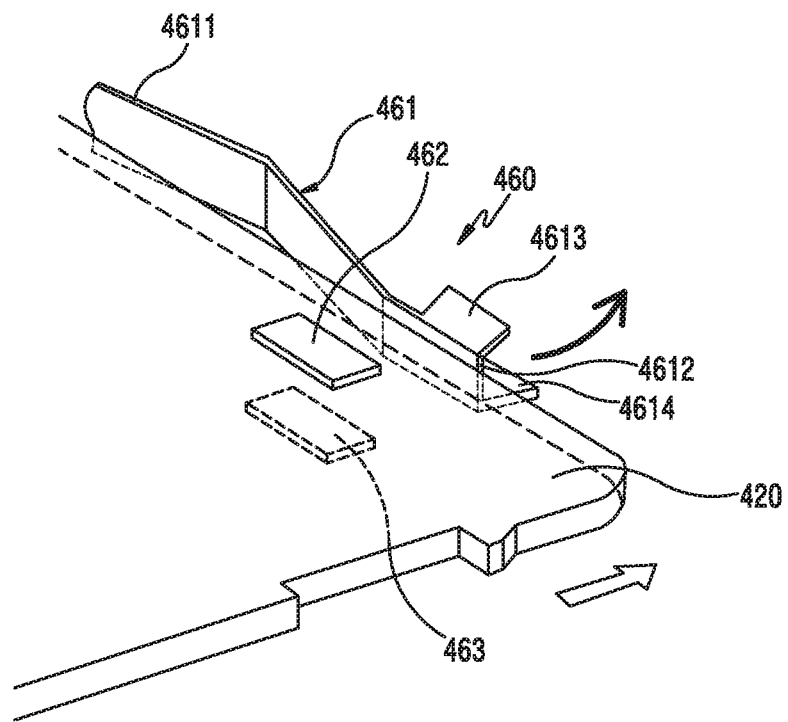
FIGS. 4B and 4C are views illustrating a tray detection device according to various embodiments of the present disclosure in the state of FIG. 4A.
Figure 4C:
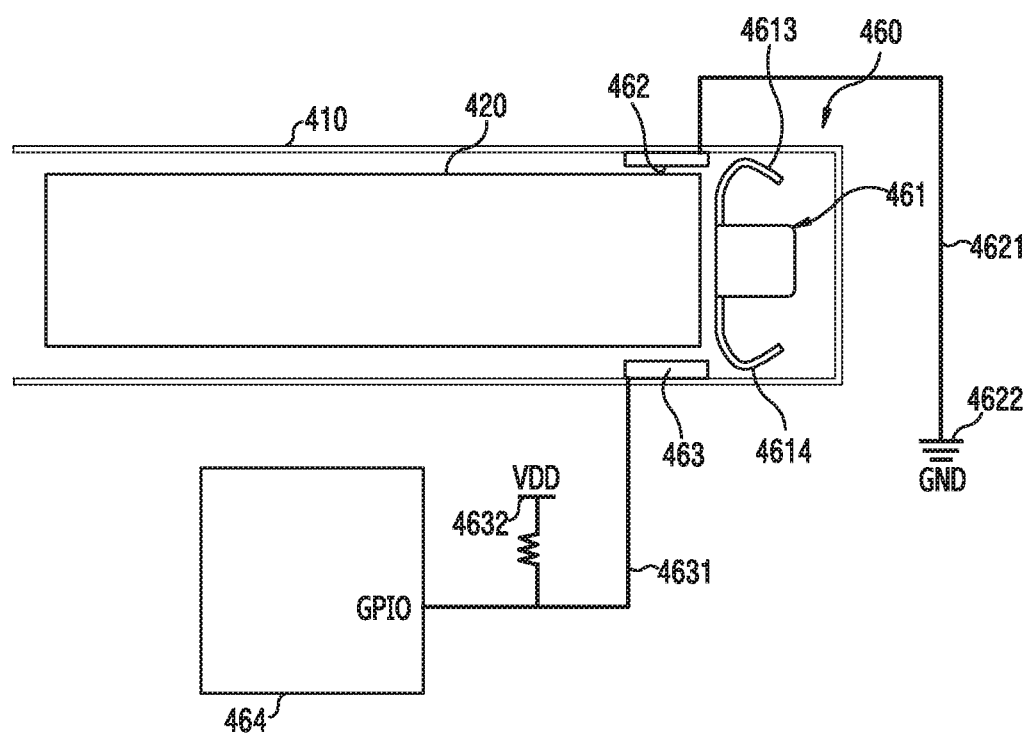

FIG. 4A is a view illustrating a state in which a tray according to various embodiments of the present disclosure is mounted to an electronic device. FIGS. 4B and 4C are views illustrating a tray detection device according to various embodiments of the present disclosure in the state of FIG. 4A.

A tray 420 of FIG. 4A may include an embodiment of a tray that is similar to or different from the tray 320 of FIG. 3.

Referring to FIGS. 4A to 4C, a tray device 400 may include a tray socket 410 disposed inside the electronic device, a tray 420 selectively inserted into the tray socket 410, a rotary lever 430 configured to fix the tray 420 inside the electronic device or to demount the fixed tray 420, a pressing lever 440 configured to induce the rotation of the rotary lever 430, and a detection device 460 configured to detect mounting/demounting of the tray.

According to various embodiments, the tray socket 410 may be disposed inside the electronic device. According to one embodiment, the tray socket 410 may be mounted on a board disposed inside the electronic device. However, without being limited thereto, the tray socket 410 may be disposed at various positions that correspond to the opening formed in the above-described electronic device. According to one embodiment, the tray socket 410 may be formed by coupling an injection-molded portion 411 of a synthetic resin and a metallic member 412 to each other. Without being limited thereto, however, the tray socket 410 may be formed of a single material. According to one embodiment, the tray socket 410 may include a tray accommodation space 413 for accommodating the tray body 421 of the tray 420, which is introduced through the opening formed in the electronic device. According to one embodiment, at least one connector may be included in the tray accommodation space 413 to be in electric contact with at least one exposed terminal of the external component C mounted on the tray body 421.

According to various embodiments, the tray 420 may include a tray body 421 inserted into a tray insertion opening of the electronic device, and a tray cover 422 disposed on an end of the tray body 421. According to one embodiment, the tray body 421 may accommodate at least one external component C. According to one embodiment, a first hook recess 4211 is formed on one side of the tray body 421, and a second hook recess 4212 is formed on the other side of the tray body 421. According to one embodiment, the first hook recess 4211 may be formed in a shape that may be hooked to a lever hook portion 4321 of the rotary lever 430 to be described later when the tray 420 is mounted on the tray socket 410. According to one embodiment, the second hook recess 4212 may be formed in a structure to which a hook portion 4141 of an elastic piece 414 disposed within the tray accommodation space 413 of the tray socket 410 may be hooked when the tray 420 is mounted on the tray socket 410.

According to various embodiments, a pin insertion hole 4221 may be formed through the tray cover 421 at a side of the tray cover 421. According to one embodiment, the pin insertion hole 4221 may accommodate a tray demounting pin 450 so as to demount the tray 420 fixed to the tray socket 410. According to one embodiment, the tray demounting pin 450 may penetrate the tray cover 422 through the pin insertion hole 4221 to press a pin contact portion 422 of the pressing lever 440 to be described later in a tray insertion direction.

According to various embodiments, the rotary lever 430 may be rotatably installed inside the tray socket 410. According to one embodiment, the rotary lever 430 may include: a first end 432 configured to fix one side of the tray 420 when the tray 420 is mounted on the tray socket 410, and to release the fixed portion when the tray 420 is demounted; and a second end 433 configured to press the tray 420 mounted on the tray socket 410 in a demounting direction by the rotation of the first end 432 about a rotation axis 431.

According to various embodiments, the first end 432 may include a lever hook portion 4321 that extends toward the tray socket, and is hooked to the first hook recess 4211 of the mounted tray 420 so as to prevent the breakaway of the tray 420. According to one embodiment, the first end 432 may include a restraint portion 4322 that is formed in a direction opposite to the lever hook portion 4321 to be restrained by the pressing lever 440. According to one embodiment, the first end 432 and the second end 433 may be integrally formed to be centered on the rotation axis 431. According to one embodiment, the lever hook portion 4321 and the restraint portion 4322 of the first end 432 may also be integrally formed. According to one embodiment, the rotary lever 430 may be formed by injection molding a synthetic resin material. According to one embodiment, the rotary lever 430 may also be formed of a metallic material.

According to various embodiments, the pressing lever 440 may be formed to have a length in the direction where the tray 420 is mounted, and may be disposed at one side of the tray socket 410. According to one embodiment, as illustrated, the pressing lever 440 may be disposed to be movable in the mounting/demounting direction of the tray 420 (direction ① in FIG. 4A). According to one embodiment, a restraint recess 441 is formed on the first end 432 of the above-mentioned rotary lever 430 such that the restraint portion 4322 formed on the first end 432 is seated on the restraint recess 441. Accordingly, when the pressing lever 440 moves in the tray mounting direction, the first end 432 of the rotary lever 430 may be rotated in the tray mounting direction (e.g., counterclockwise in the direction ② in FIG. 4A) around the axis 431, and the second end 433 may also be rotated in the tray demounting direction (e.g., counterclockwise in the direction ② in FIG. 4A) by the rotation of the first end 432.

According to various embodiments, the pressing lever 440 may be installed to be pressed in the direction of demounting the tray 420 from the tray socket 410 by the elastic member 444 disposed on one end thereof. According to one member, the elastic member 444 may include a spring. According to one member, the spring may include a coiled compression spring. According to one embodiment, when the spring is used as the elastic member 444, the spring may be installed in such a manner in which a shaft 443 formed to extend from one end of the pressing lever 440 penetrates the spring. According to one embodiment, the restoring force of the pressing lever 440 by the elastic member 444 may provide a restraint force that suppresses the lever hook portion 4321, which is formed on the first end 432 of the rotary lever 430, from arbitrarily breaking away from the first hook recess 4211 of the tray body 421. According to one embodiment, the other end of the pressing lever 440 may include a pin contact portion 442. According to one embodiment, the pin contact portion 442 may be formed in a shape with which the end of the tray demounting pin may smoothly come in contact after passing through the pin insertion hole 4221 of the tray cover 422.

According to various embodiments, both of the rotary lever 430 and the pressing lever 440 may be formed in a space other than the tray mounting space inside the tray socket. Without being limited thereto, however, at least a portion of the rotary lever 430 and the pressing lever 440 may be disposed inside the housing of the electronic device and outside the tray socket.

According to various embodiments, when the tray 420 is mounted on the tray socket 410, the first end 432 of the rotary lever 430 may be slightly retracted backward by the portion where the first hook recess 4211 of the tray body 421 is initiated, and the lever hook portion 4321 of the first end 432 may be hooked in a manner of being seated in the first hook recess 4211 of the tray body 421 by the continuous mounting operation of the tray 420. In this example, by the pressing force of the pressing lever 440 pressed by the elastic member 444, the rotary lever 430 is provided with a force to continuously rotate the rotary lever 430 clockwise about the rotation axis 431, and with the aid of the rotating force, the lever hook portion 4321 of the first end 432 may not break away from the first hook recess 4211. According to one embodiment, the hook portion 4141 of the elastic piece 414 provided in the tray socket 410 is also hooked to the second hook recess 4212 of the tray body 421 such that the both side faces of the tray 420 can be fixed.

According to various embodiments, the detection device 460 may include a conductive member 461 disposed to have a restoring force in the manner of being retracted by the end of the tray 420 mounted inside the tray mounting space 413, and a pair of terminals 462 and 463 selectively electrically connected to each other by the floating member 461. According to one embodiment, the pair of terminals 462, 463 may include: a first terminal 462 electrically connected to a ground portion of the electronic device; and a second terminal 463 electrically connected to a control circuit of the electronic device (e.g., an AP including a GPIO pin port), and configured to be applied with power (VDD). According to one embodiment, when the tray 420 is mounted to the electronic device, the floating member 461 may cause the first terminal 462 and the second terminal 463 not to be electrically connected to each other, and when the tray 420 is demounted from the electronic device, the floating member 461 is returned to the original position thereof to come in physical contact with the first terminal 462 and the second terminal 463 such that both terminals can be electrically connected with each other. According to one embodiment, the electronic device may detect the mounting/demounting of the tray 420 depending on whether the pair of terminals 462 and 463 are electrically connected or not.

Referring to FIG. 4B, according to various embodiments, the floating member 461 may include a first end 4611 fixed to the inside of the electronic device and a second end 4612 that has a restoring force by mounting the tray 420 and is disposed at a position where the second end is retractable backward. According to one embodiment, the second end 4612 may include a first contact piece 4613 extending outwardly from the top side, and a second contact piece 4614 extending outwardly from the bottom side. According to one embodiment, when the second end 4612 of the floating member 461 is not interfered with the tray 420, the second end 4612 may be positioned between the first and second terminals 462 and 463. According to one embodiment, when the second end 4612 is disposed between the first and second terminals 462 and 463, the first contact piece 4613 may come in physical contact with the first terminal 462, and the second contact piece 4614 may come in physical contact with the second terminal 463. According to one embodiment, the floating member 461 may be formed of a conductive material, and the first and second terminals 462 and 463 may be electrically connected to each other by the first contact piece 4613 and the second contact piece 4614.

According to various embodiments, the first terminal 462 and the second terminal 463 may be arranged to be spaced apart by a predetermined interval from each other at the positions where at least partial regions thereof vertically overlap with each other. Accordingly, the tray 420 floats between the first terminal 462 and the second terminal 463, and may move without coming in contact with both the first and second terminals. According to one embodiment, when the tray 420 is mounted inside the electronic device, the tray 420 may move between the first and second terminals 462 and 463 so that the second end 4612 of the floating member 461 is retractable backward. According to one embodiment, as the second end 4612 of the floating member 461 is retracted, the first contact piece 4613 may separate from the first terminal 462, and the second contact piece 4614 may separate from the second terminal 463. Accordingly, the first and second terminals 462 and 463 may maintain the electrically separated state, and the electronic device may detect the mounting of the tray 420 by the electric separation of the first and second terminals 462 and 463.

Referring to FIG. 4C, the first terminal 462 may be electrically connected to the ground portion 4622 of the electronic device via the first electric path 4621. According to one embodiment, the second terminal 463 may be electrically connected to a General Purpose Input/Output (GPIO) pin port disposed in a control circuit 464 (e.g., an AP or a processor) via the second electric path 4631. According to one embodiment, in the second electric path 4631, the power supply unit (VDD) 4632 may be electrically connected, and depending on whether the power of the power supply unit (VDD) 4632 is applied, the control circuit 464 may receive a Low signal or a High signal applied to the GPIO pin port so as to determine whether the tray is mounted.

According to various embodiments, when the tray 420 is completely mounted to the electronic device, the second end 4612 of the floating member 461 is retracted by the end of the tray 420, and thus, the first contact piece 4613 may separate from the first terminal 462, and the second contact piece 4614 may separate from the second terminal 463. Accordingly, the first and second terminals 462 and 463 may maintain the electrically separated state, and due to this, the power supplied from the power supply unit (VDD) 4632 cannot be grounded to the ground portion 4622 via the second terminal 463, the floating member 461, and the first terminal 462. Thus, the electronic device may receive the High signal through the GPIO pin port of the control circuit 464, and may detect that the tray 420 is substantially inserted into the electronic device.

Figure 5A:
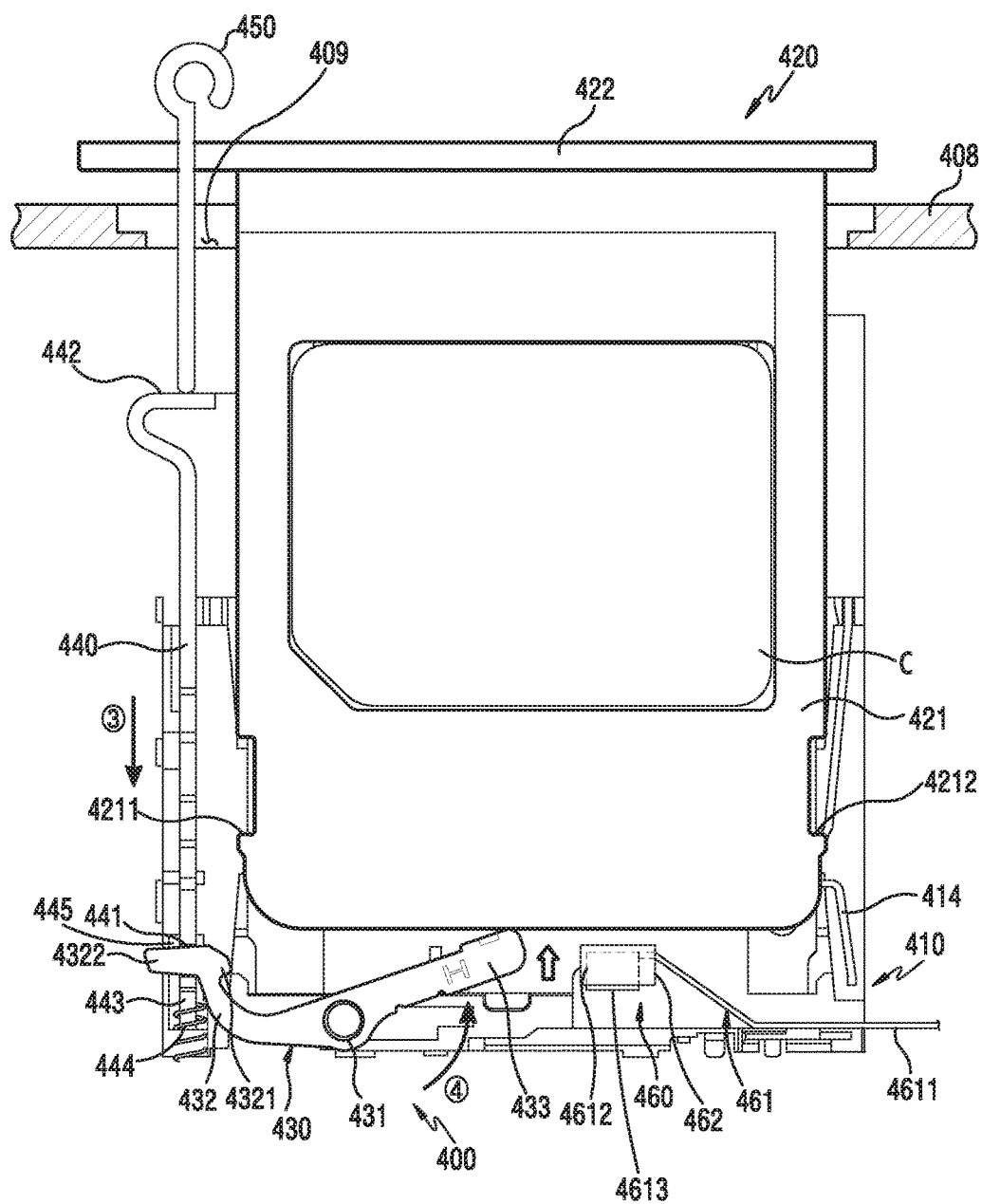
FIG. 5A is a view illustrating a state in which a tray according to various embodiments of the present disclosure is demounted from an electronic device.
Figure 5B:
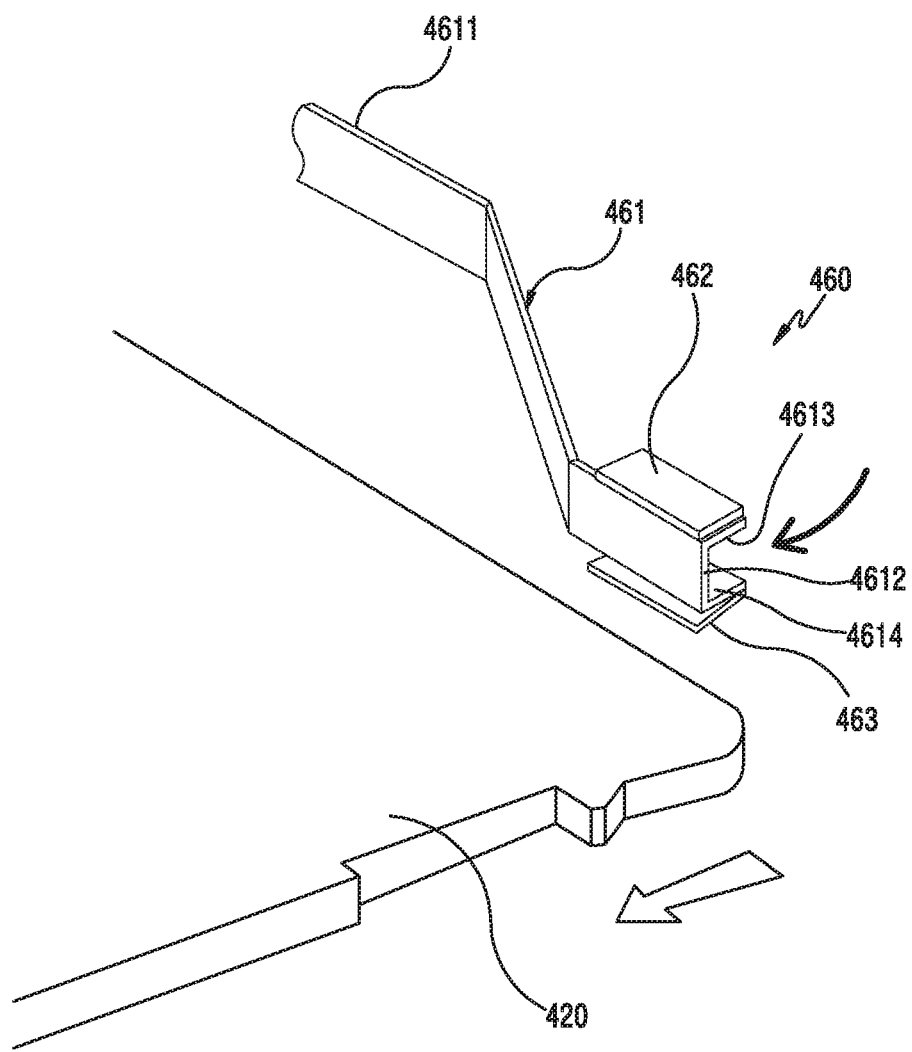
FIGS. 5B and 5C are views illustrating a tray detection device according to various embodiments of the present disclosure in the state of FIG. 5A.
Figure 5C:
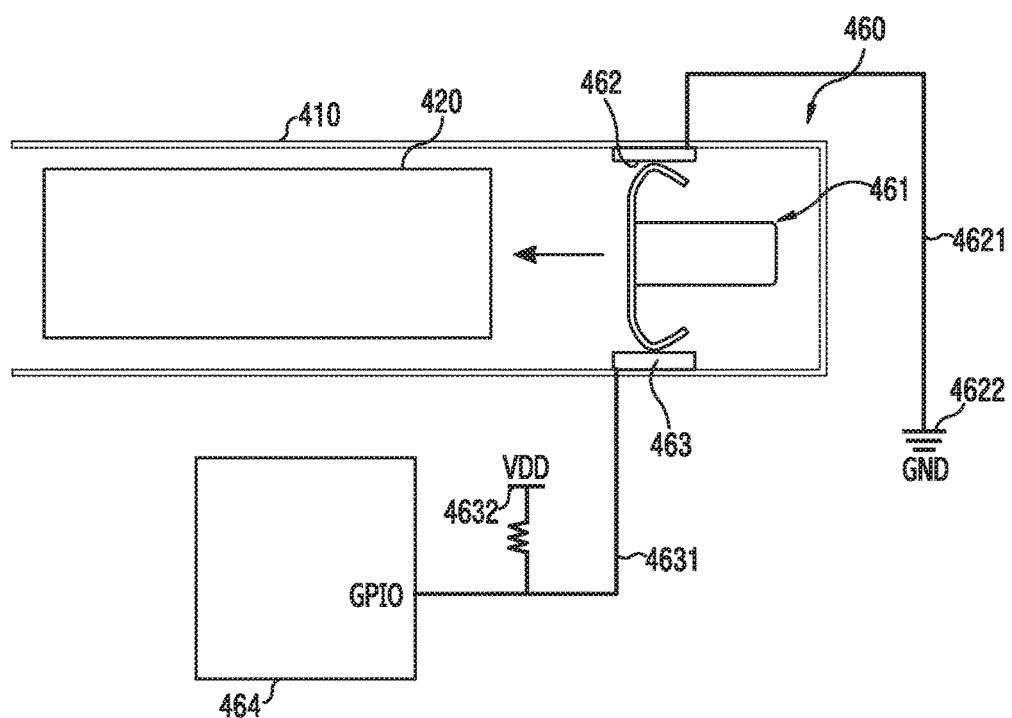

FIG. 5A is a view illustrating a state in which a tray according to various embodiments of the present disclosure is demounted from an electronic device. FIGS. 5B and 5C are views illustrating a tray detection device according to various embodiments of the present disclosure in the state of FIG. 5A.

Referring to FIG. 5A, the tray 420 may be demounted to the outside of the electronic device by the rotary lever 430 and the pressing lever 440.

According to various embodiments, in the state where the tray 420 is substantially mounted on the tray socket 410, the tray demounting pin 450 may penetrate the tray cover 422 through the pin insertion port, and then may press the pin contact portion 442 of the pressing lever 440 with a predetermined pressing force in the direction ③ in FIG. 5A. According to one embodiment, the pressed pressing lever 440 retains an elastic force by the elastic member 444 and at the same time, moves downward, which allows the first end 432 of the rotary lever 430 restrained in the restraint recess 441 of the pressing lever 440 to move as well while drawing an arc in a counterclockwise about the rotation axis 431. At the same time, the lever hook portion 4321 of the first end 432 may be released from the restraint by breaking away from the first hook recess 4211 of the tray cover 421. According to one embodiment, by the rotation of the first end 432, the second end 433 of the rotary lever 430 may also rotate in the direction ④ in FIG. 5A (counterclockwise about the rotation axis). In this example, the second end 433 may press the tray 420 in the demounting direction such that the tray 420 may be demounted to the outside of the electronic device.

According to various embodiments, after the tray 420 and the tray demounting pin 450 are removed, the pressing lever 440 may be returned to the original position thereof by the restoring force of the elastic member 444. According to various embodiments, the tray 420 may further include a lever restraint piece 445. The lever restraint piece 445 may restrain the clockwise rotation of the lever 440 such that the lever hook portion 4321 does not enter into a virtual tray region when the lever 440 is rotated clockwise by the restoring force of the elastic member 444. Accordingly, the rotary lever 430 may be maintained in the same state as that illustrated in FIG. 4A.

Referring to FIG. 5B, according to various embodiments, when the second end 4612 of the floating member 461 is not interfered by the tray 420, the second end 4612 may be positioned between the first and second terminals 462 and 463. According to one embodiment, when the second end 4612 is disposed between the first and second terminals 462 and 463, the first contact piece 4613 may come in physical contact with the first terminal 462, and the second contact piece 414 may come in physical contact with the second terminal 463. According to one embodiment, the floating member 461 may be formed of a conductive material, and the first and second terminals 462 and 463 may be electrically connected to each other by the first contact piece 4613 and the second contact piece 4614.

According to various embodiments, when the tray 420 floats between the first terminal 462 and the second terminal 463 to be removed, the tray 420 may move without coming in contact with both the first and second terminals. According to one embodiment, when the tray 420 is separated within the electronic device, the tray 420 may move outwardly from the area between the first and second terminals 462 and 463, and the second end 4612 of the floating member 461 may be drawn into the area between the first and second terminals 462 and 463. According to one embodiment, the first contact piece 4613 of the second end 4612 of the floating member 461, which is drawn into the area between the first and second terminals 462 and 463, comes in physical contact with the first terminal 462, and the second contact piece 4614 may come in physical contact with the second terminal 463. According to one embodiment, the first and second terminals 462 and 463 may maintain the electrically connected state by the floating member 461, and the electronic device may detect the demounting of the tray 420 by the electric connection of the first and second terminals 462 and 463.

Referring to FIG. 5C, in the example where the tray 420 substantially breaks away from the electronic device, as the second end 4612 of the floating member 461 is drawn into the area between the first and second terminals 462 and 463 by the restoring force of the floating member 461, the first contact piece 4613 may come in physical contact with the first terminal 462, and the second contact piece 4614 may come in physical contact with the second terminal 463. Accordingly, the first and second terminals 462 and 463 may maintain the electrically connected state, and due to this, the power supplied from the power supply unit (VDD) 4632 can be grounded to the ground portion 4622 via the second terminal 463, the floating member 461, and the first terminal 462. Thus, the electronic device may receive the Low signal through the GPIO pin port of the control circuit 464, and may detect that the tray 420 is separated from the electronic device.

According to various embodiments, in the example where the tray socket 410 is made of a conductive member that is electrically connected to the ground portion 4622 of the electronic device, the first terminal 462 may be formed to protrude to a portion of the tray socket 410. According to various embodiments, in the example where the tray socket 410 is made of a conductive member that is electrically connected to the ground portion 4622 of the electronic device, the floating member 461 may also be formed to extend to a portion of the tray socket 410.

According to various embodiments, the tray fixing and demounting structures illustrated in FIGS. 4A to 5C merely correspond to an exemplary embodiment, and other various embodiments may be applied.

Figure 6A:
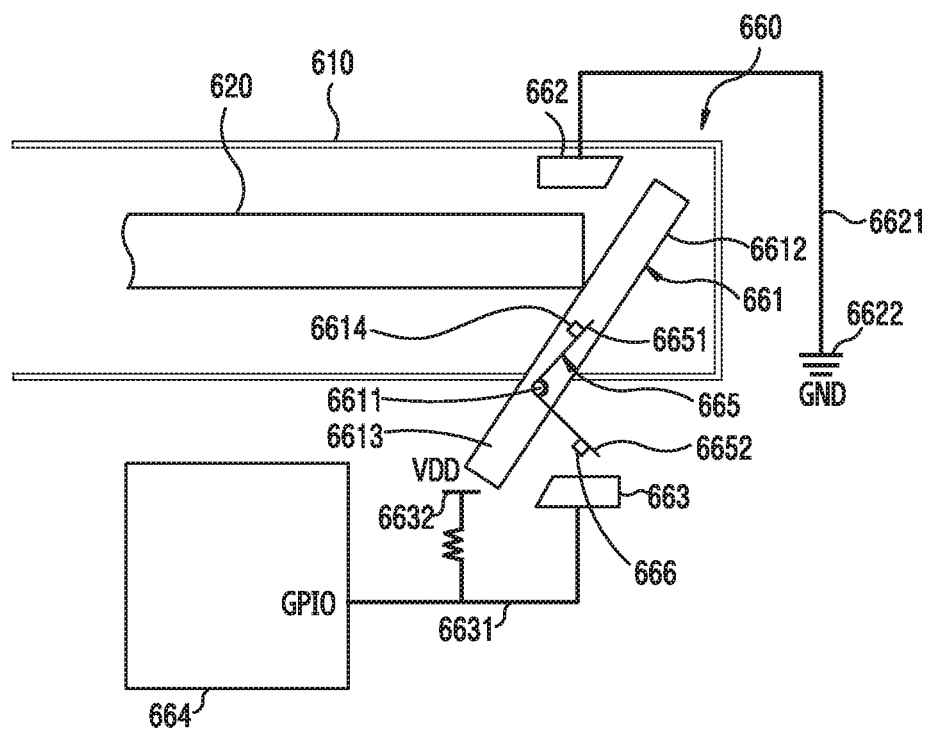
FIGS. 6A and 6B are views each illustrating a configuration of a detection device according to the mounting/demounting of a tray according to various embodiments of the present disclosure.
Figure 6B:
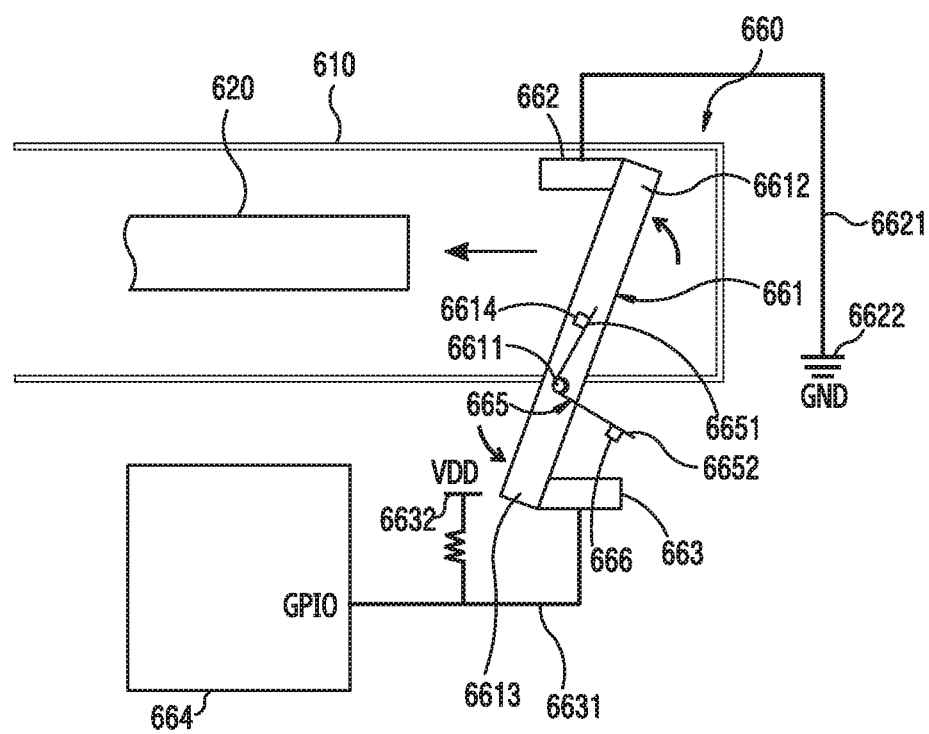

FIGS. 6A and 6B are views each illustrating a configuration of a detection device 660 according to the mounting/demounting of a tray according to various embodiments of the present disclosure.

The detection device 660 of FIGS. 6A and 6B may be another embodiment of a detection device that is similar to, or different from, the detection device 460 of FIGS. 4A to 5C.

Referring to FIG. 6A, the detection device 660 may include a conductive rotary member 661 disposed to have a restoring force in the manner in which a partial region is retracted by being rotated by the end of the tray 620 mounted inside the tray mounting space, and a pair of terminals 662 and 663 selectively electrically connected to each other by the rotary member 661. According to one embodiment, the pair of terminals 662, 663 may include: a first terminal 662 electrically connected to a ground portion 6622 of the electronic device; and a second terminal 663 electrically connected to a control circuit 664 of the electronic device (e.g., an AP including a GPIO pin port), and configured to be applied with power (VDD). According to one embodiment, when the tray 620 is mounted to the electronic device, the rotary member 661 may cause the first terminal 662 and the second terminal 663 not to be electrically connected to each other, and when the tray 620 is demounted from the electronic device, the floating member 461 is returned to the original position thereof to come in physical contact with the first terminal 662 and the second terminal 663 such that both terminals can be electrically connected with each other. According to one embodiment, the electronic device may detect the mounting/demounting of the tray 620 depending on whether the pair of terminals 662 and 663 are electrically connected or not through the control circuit 664.

According to various embodiments, the rotary member 661 is fixed to be rotatable about the rotation axis 6611 within the electronic device, and, with reference to the rotation axis 6611, may include a first end 6612 disposed inside the mounting/demounting space of the tray 620 and a second end 6613 disposed outside the mounting/demounting space of the tray 620. According to one embodiment, the rotary member 661 may include an elastic member 665 that provides a rotating force that causes the first end 6612 to be in contact with the first terminal 662 and the second end 6613 to be in contact with the second terminal 663. According to one member, the elastic member 665 may include a torsion spring member. Accordingly, when the interference of the tray 620 does not exist, the rotary member 661 may be provided with a rotating force to be rotated counterclockwise about the rotation axis 6611 by the elastic member 665.

According to various embodiments, the elastic member 665 may include a support end 6652 supported by a support protrusion 666 disposed inside the electronic device, and a free end 6651 that rotates the first end 6612 of the rotary member 661 toward the first terminal 662 while being supported by the support end 6652. According to one embodiment, the free end 6651 may provide a rotating force to the rotary member 661 in a manner in which the free end 6651 is hooked to a hook protrusion 6614 disposed on the rotary member 661. According to one embodiment, the rotary member 661 may be formed of a conductive material, and the first and second terminals 662 and 663 may be electrically connected to each other by the first end 6612 and the second end 6613.

According to various embodiments, the first terminal 662 and the second terminal 663 may be arranged to be spaced apart from each other within the rotating range of the rotary member 661. According to one embodiment, when the tray 620 is mounted inside the electronic device, the first end 6612 of the rotary member 661 may be retracted backward to be spaced apart from the first terminal 662. In this example, the second end 6613 of the rotary member 661 may also be naturally spaced apart from the second terminal 663 with reference to the rotation axis 6611. Accordingly, the first and second terminals 662 and 663 may maintain the electrically separated state, and the electronic device may detect the mounting of the tray 620 by the electric separation of the first and second terminals 662 and 663.

According to various embodiments, the first terminal 662 may be electrically connected to the ground portion 6622 of the electronic device via the first electric path 6621. According to one embodiment, the second terminal 663 may be electrically connected to a General Purpose Input/Output (GPIO) pin port disposed in a control circuit 664 (e.g., an AP or a processor) via the second electric path 6631. According to one embodiment, in the second electric path 6631, the power supply unit (VDD) 6632 may be electrically connected, and depending on whether the power of the power supply unit (VDD) 6632 is applied, the control circuit 664 may receive a Low signal or a High signal applied to the GPIO pin port so as to determine whether the tray is mounted.

According to various embodiments, when the tray 620 is substantially mounted to the electronic device, the first end 6612 of the rotary member 661 may separate from the first terminal 662 by the end of the tray 620, and at the same time, the second end 6613 may also separate from the second terminal 663. Accordingly, the first and second terminals 662 and 663 may maintain the electrically separated state, and due to this, the power supplied from the power supply unit (VDD) 6632 cannot grounded to the ground portion 6622 via the second terminal 663, the rotary member 661, and the first terminal 662. Thus, the electronic device may receive the High signal through the GPIO pin port of the control circuit 664, and may detect that the tray 620 is substantially inserted into the electronic device.

Referring to FIG. 6B, when the tray 620 is removed from the electronic device so as not to be interfered, the first end 6612 of the rotary member 661 may come in physical contact with the first terminal 662 and the second end 6613 of the rotary member 661 may come in physical contact with the second terminal 663. According to one embodiment, the first and second terminals 662 and 663 may maintain the electrically connected state by the rotary member 661, and the electronic device may detect the demounting of the tray 620 by the electric connection of the first and second terminals 662 and 663.

According to various embodiments, when the tray 620 substantially breaks away from the electronic device, the first end 6612 of the rotary member 661 may come in physical contact with the first terminal 662 by the restoring force of the rotary member 661, and the second end 6613 may come in physical contact with the second terminal 663. Accordingly, the first and second terminals 662 and 663 may maintain the electrically connected state, and due to this, the power supplied from the power supply unit (VDD) 6632 can be grounded to the ground portion 6622 via the second terminal 663, the rotary member 661, and the first terminal 662. Thus, the electronic device may receive the Low signal through the GPIO pin port of the control circuit 664, and may detect that the tray 620 is separated from the electronic device.

According to various embodiments, in the example where the tray socket 610 is made of a conductive member that is electrically connected to the ground portion 6622 of the electronic device, the first terminal 662 may be formed to protrude to a portion of the tray socket 610.

According to various embodiments, when the tray is demounted for the hole of the electronic device, the first terminal and the second terminal may be directly electrically connect each other. In this case one of the first terminal and the second terminal may be electrically separated from the other according to the mounting of the tray.

According to various embodiments, there may be provided an electronic device including: a housing including a first face, a second face that faces opposite to the first face, and a side face that encloses at least a portion of a space between the first face and the second face; an opening formed in a portion of the side face of the housing; a hole continued to the opening; a tray including a first side face, a second side face at a side opposite to the first side face, a third face that extends between the first side face and the second side face, and a fourth side face that extends between the first side face and the second side face at a side opposite to the third side face, the tray having a length to be entirely inserted into the hole and configured to be demountable from the hole; a first fixing structure disposed to be substantially parallel to the first side face and/or the second side face of the tray inside the hole, and configured to be at least partially rotated about an axis in a first direction that is outwardly directed from the hole; first and second terminals vertically arranged inside the hole with the tray being interposed therebetween such that the first and second terminals do not come in contact with the tray; and a control circuit electrically connected to at least one of the first terminal and the second terminal, wherein, when the first terminal and the second terminal are electrically connected to each other, the control circuit is configured to detect demounting of the tray, and when the first terminal and the second terminal are electrically separated from each other, the control circuit is configured to detect mounting of the tray from the hole portion.

According to various embodiments, the first terminal may be electrically connected to a ground portion of the electronic device.

According to various embodiments, the second terminal may be disposed inside the electronic device, and may be electrically connected to a GPIO pin port of a control circuit via an electric connection path to which power (VDD) is applied.

According to various embodiments, the electronic device may further include a conductive member having at least partial elasticity, and disposed inside the hole portion, wherein the conductive member is configured to substantially contact the first terminal and the second terminal between the first terminal and the second terminal during mounting of the tray, and wherein the conductive member is disposed to float substantially spaced apart from the first terminal and the second terminal when the tray is demounted.

According to various embodiments, the electronic device may further include a conductive tray socket configured to accommodate the tray inside the hole of the electronic device.

According to various embodiments, the first terminal or the second terminal may extend from at least a portion of the tray socket.

According to various embodiments, the floating member may include: a first end disposed inside the electronic device; a second end extending by a predetermined length from the first end, and disposed between the first terminal and the second terminal; a first contact piece extending from a first portion of the second end to be substantially in contact with the first terminal; and a second contact piece extending from a second portion of the second end to be substantially in contact with the second terminal.

According to various embodiments, the second end of the floating member may be retracted backward by the end of the tray mounted inside the hole such that at least one of the first contact piece and the second contact piece may be substantially spaced apart from the first terminal or the second terminal.

According to various embodiments, the tray may be configured to: at least partially come in contact with the first fixing structure with the second side face of the tray being arranged to be substantially flush with another portion of the side face of the housing when the tray is entirely inserted into the hole; and release from the hole when the first fixing structure is at least partially rotated in the first direction.

According to various embodiments, when the tray is entirely inserted into the hole, at least a portion of the first side face of the tray may come in contact with the first fixing structure.

According to various embodiments, the electronic device may include at least one protrusion protruding from at least a portion inside the hole, and configured to limit the rotation of the first fixing structure.

According to various embodiments, the third side face of the tray may include a recess, and when the tray is entirely inserted into the hole, at least a portion of the first fixing structure may be inserted into the hole.

According to various embodiments, the electronic device may further include a second fixing structure disposed inside the hole in a longitudinal direction of the hole. The fourth side face of the tray may include a recess, and when the tray is entirely inserted into the hole, at least a portion of the second fixing structure may be inserted into the hole.

According to various embodiments, the tray may be configured to mount at least one card-type external device thereon.

According to various embodiments, the tray may include at least one opening, and the at least one card-type external device may be configured to be mounted inside the at least one opening of the tray.

According to various embodiments, the floating member may include: a first end configured to rotate about the rotation axis by a predetermined angle inside the hole and disposed to substantially come in contact with the first terminal; a second end extending in a direction opposite to the first end with reference to the rotation axis, and disposed to substantially come in contact with the second terminal; and an elastic member configured to provide a rotating force to the floating member to cause the first end to come in contact with the first terminal and the second end to come in contact with the second terminal.

According to various embodiments, the first end of the floating member may be rotated in a retract direction by the end of the tray mounted inside the hole such that the first end may be spaced apart from the first terminal and the second end may be spaced apart from the second terminal.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. An electronic device comprising:
  a housing including a first face, a second face that faces opposite to the first face, and a side face that encloses at least a portion of a space between the first face and the second face;
  an opening formed in a portion of the side face of the housing, wherein the opening includes a hole portion;
  a tray including a first side face, a second side face at a side opposite to the first side face, a third side face that extends between the first side face and the second side face, and a fourth side face that extends between the first side face and the second side face at a side opposite to the third side face, the tray having a length and configured to be inserted into the hole portion during mounting of the tray and removed from the hole portion when the tray is demounted;
  a first fixing structure disposed to be substantially parallel to at least one of the first side face or the second side face of the tray, and configured to be at least partially rotated about an axis in a first direction that is outwardly directed from the hole portion;
  a first terminal and a second terminal, wherein the first terminal and the second terminal are vertically arranged inside the hole portion with the tray being interposed therebetween such that the first terminal and the second terminal do not contact the tray; and
  a control circuit electrically connected to at least one of the first terminal and the second terminal,
  wherein, when the first terminal and the second terminal are electrically connected to each other, the control circuit is configured to detect demounting of the tray, and when the first terminal and the second terminal are electrically separated from each other, the control circuit is configured to detect mounting of the tray from the hole portion.

2. The electronic device of claim 1, wherein the first terminal is electrically connected to a ground portion of the electronic device.

3. The electronic device of claim 2, wherein the second terminal is electrically connected to a general purpose input/output (GPIO) pin port of the control circuit via an electric connection path to which power (VDD) is applied.

4. The electronic device of claim 1, further comprising:
  a conductive member having at least partial elasticity, and disposed inside the hole portion,
  wherein the conductive member is configured to substantially contact the first terminal and the second terminal between the first terminal and the second terminal during mounting of the tray, and
  wherein the conductive member is disposed to float substantially spaced apart from the first terminal and the second terminal when the tray is demounted.

5. The electronic device of claim 4, wherein the conductive member includes:
  a first end disposed inside the electronic device;
  a second end extending a predetermined length from the first end, and disposed between the first terminal and the second terminal;
  a first contact piece extending from a first portion of the second end and configured to be substantially in contact with the first terminal; and
  a second contact piece extending from a second portion of the second end and configured to be substantially in contact with the second terminal.

6. The electronic device of claim 5, wherein when the tray is mounted inside the hole portion, the second end of the conductive member is retracted backward by an end of the tray such that at least one of the first contact piece or the second contact piece is substantially spaced apart from the first terminal or the second terminal, respectively.

7. The electronic device of claim 4, wherein the conductive member includes:

a first end configured to rotate about a rotational axis by a predetermined angle inside the hole portion and disposed to substantially contact the first terminal;

a second end extending in a direction opposite to the first end with reference to the rotational axis, and disposed to substantially contact the second terminal; and an elastic member configured to provide a rotational force to the conductive member and to cause the first end to contact the first terminal and the second end to contact the second terminal.

8. The electronic device of claim 7, wherein when the tray is mounted inside the hole portion, the first end of the conductive member is rotated in a retract direction by an end of the tray such that the first end is spaced apart from the first terminal and the second end is spaced apart from the second terminal.

9. The electronic device of claim 7, wherein the first terminal is electrically connected to a ground portion of the electronic device.

10. The electronic device of claim 9, wherein the second terminal is electrically connected to a GPIO pin port of the control circuit via an electric connection path to which power (VDD) is applied.

11. The electronic device of claim 10, wherein, one of the first terminal and the second terminal is electrically separated from the other according to the mounting of the tray.

12. The electronic device of claim 1, further comprising:
a conductive tray socket configured to accommodate the tray being inserted and mounted inside the hole portion.

13. The electronic device of claim 12, wherein the first terminal or the second terminal extends from at least a portion of the conductive tray socket.

14. The electronic device of claim 1, wherein the tray is further configured to:

at least partially contact the first fixing structure with the second side face of the tray and being arranged to be substantially flush with another portion of the side face of the housing when the tray is substantially inserted into the hole portion; and release from the hole portion when the first fixing structure is at least partially rotated in the first direction.

15. The electronic device of claim 1, wherein, when the tray is substantially inserted into the hole portion, at least a portion of the first side face of the tray is configured to contact the first fixing structure.

16. The electronic device of claim 1, further comprising:
at least one protrusion protruding from at least a part of inside the hole portion, and configured to limit rotation of the first fixing structure.

17. The electronic device of claim 1, wherein the third side face of the tray includes a recess, and when the tray is substantially inserted into the hole portion, at least a portion of the first fixing structure is inserted into the hole portion.

18. The electronic device of claim 1, further comprising:
a second fixing structure disposed inside the hole portion in a longitudinal direction of the hole portion, wherein the fourth side face of the tray includes a recess, and when the tray is substantially inserted into the hole portion, at least a portion of the second fixing structure is inserted into the hole portion.

19. The electronic device of claim 1, wherein the tray is configured to mount at least one card-type external device thereon.

20. The electronic device of claim 19, wherein the tray includes at least one opening, and the at least one card-type external device is configured to be mounted inside the at least one opening of the tray.

* * * * *